June 27, 1944.  M. N. TRAINER  2,352,223
BRAKING APPARATUS
Filed Feb. 9, 1942   2 Sheets-Sheet 1
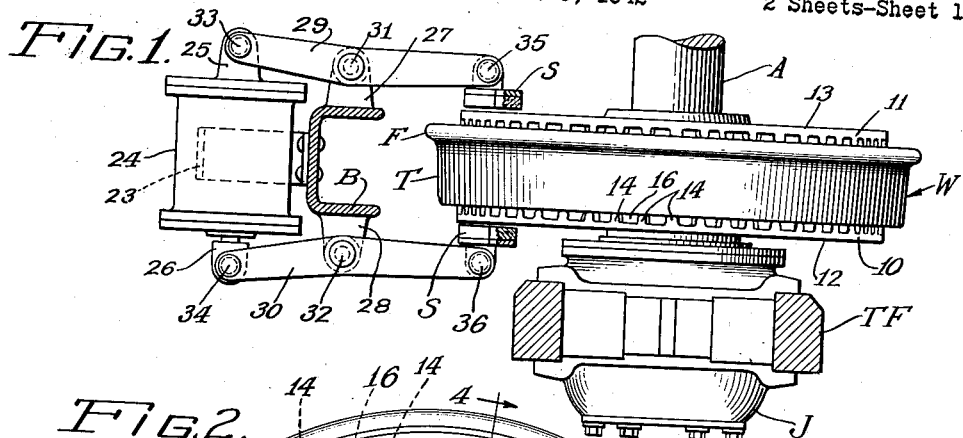
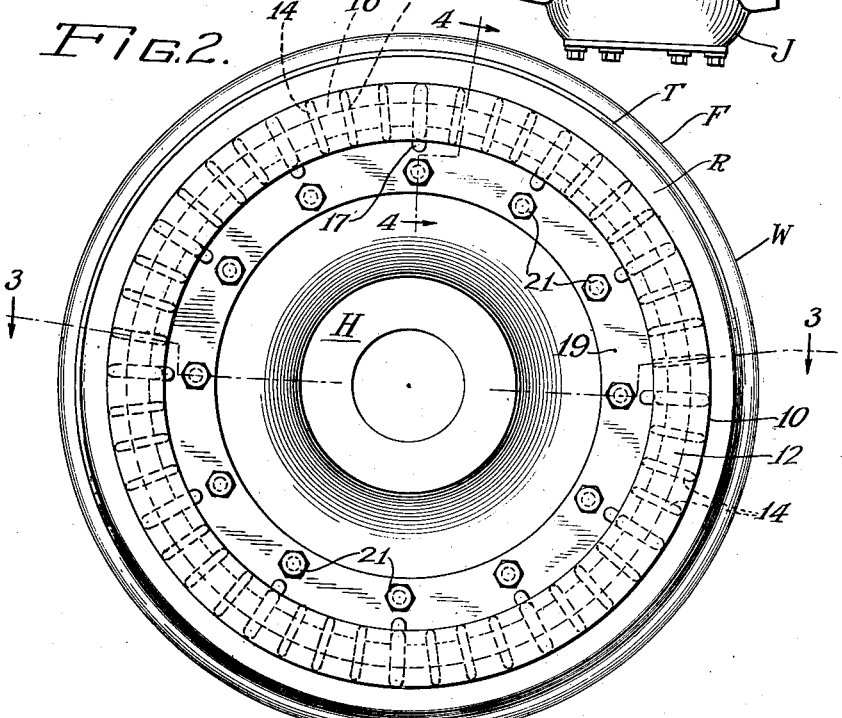
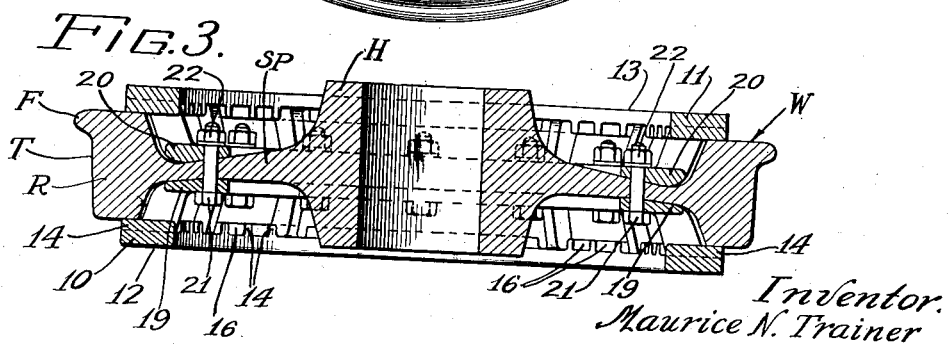
Inventor.
Maurice N. Trainer
By Wallace and Cannon
Attorneys June 27, 1944.  M. N. TRAINER  2,352,223
BRAKING APPARATUS
Filed Feb. 9, 1942  2 Sheets-Sheet 2
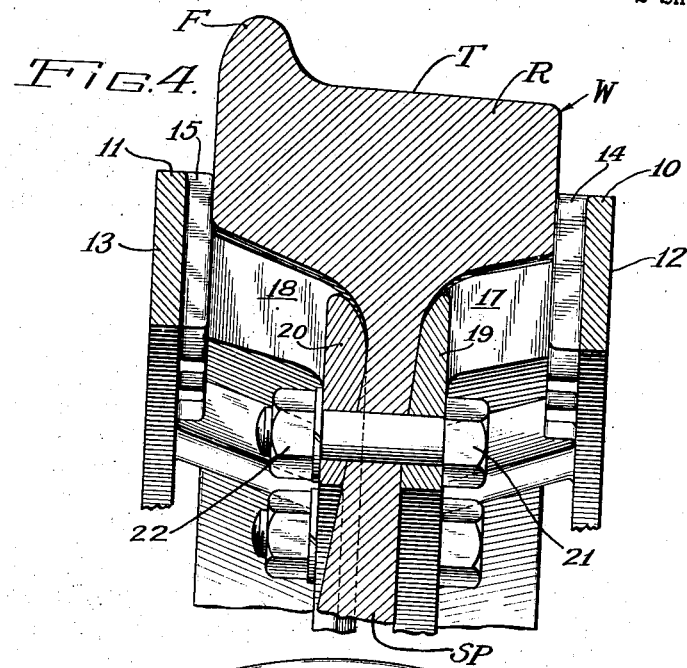
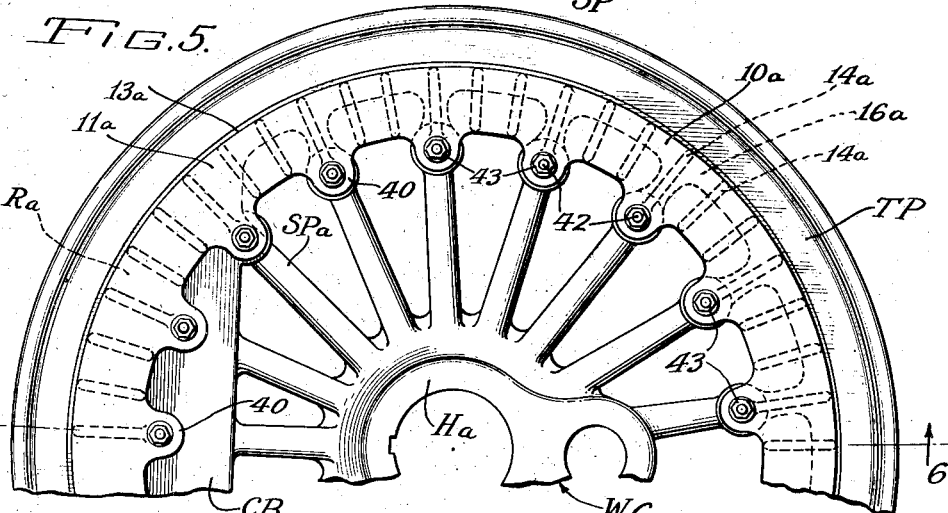
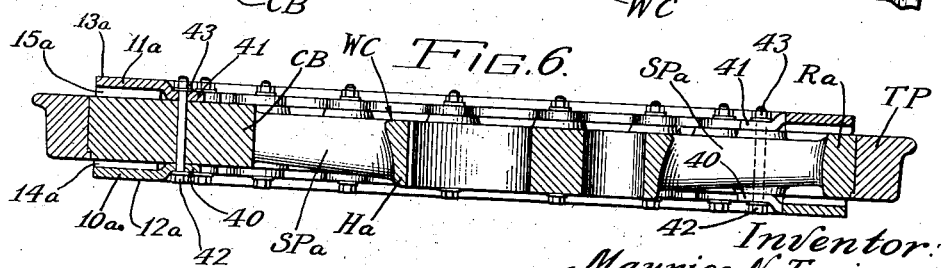
Inventor:
Maurice N. Trainer
By Wallace and Cannon
Attorneys Patented June 27, 1944

2,352,223

UNITED STATES PATENT OFFICE 2,352,223

BRAKING APPARATUS

Maurice N. Trainer, East Orange, N. J., assignor to American Brake Shoe Company, a corporation of Delaware Application February 9, 1942, Serial No. 430,124

10 Claims. (Cl. 188—264)

This invention relates to braking apparatus of the character employed on railway and like equipment.

In those instances where deceleration of a rotating element is effected by the forceful application of at least one braking means to an axially inner face or an axially outer face, or both such faces, of the element, it is desirable to apply the means to the element close to the periphery thereof for so to do enables the means to be applied to a relatively protracted surface, which is advantageous in many ways. Thus where a braking means or element, as a brake shoe, is applied to an axially inner or an axially outer face of a railway wheel to effect deceleration thereof, such element is advantageously applied to the side face of the rim of the wheel since this enables the element to be applied to the longest surface available on the axially inner or axially outer face of the wheel. However, in such an arrangement the rim of the wheel is heated as an incident to the dissipation of energy in the course of a deceleration so effected and in some instances it may be desirable to avoid such heating of the rim of a railway wheel.

Therefore, one of the primary objects of the present invention is to enable a braking element to be applied to a rotatable element such as a railway wheel close to the periphery of the element and yet avoid objectionable heating of the peripheral portion of the rotative element as, for example, the rim of a railway wheel.

Further objects of this invention related to the foregoing are to afford a braking surface on an axially inner face or an axially outer face, or both such faces, of a rotative element in juxtaposition to the periphery of such an element but in such spaced relation therewith that channels will be afforded between the braking surface so afforded and the element and through which air may be caused to flow, to thereby promote the dissipation of heat generated as an incident to decelerations effected by the application of a braking element to such a braking surface so that objectionable heating of the rotative element primarily at the peripheral portion thereof will be avoided; to enable a portion providing a braking surface of the aforesaid character to be detachably connected to a rotative element in juxtaposition to the periphery thereof; and to so secure a part providing a braking surface of the aforesaid character on a rotative element that installation and removal of the part may be expeditiously effected when and as desired or required.

In those instances where a part providing a braking element on the axially inner or axially outer face of a railway wheel is to be afforded, it is advantageous to so arrange the part that it may be secured to the wheel in such position that it is to cooperate with a side face of the rim of the wheel for in this manner a relatively protracted braking surface may be afforded on the wheel, and so to do is yet another object of the present invention; and objects related to the foregoing are to so space a part providing a braking surface on an axially inner or an axially outer face of a railway wheel or the like from the side face of the rim that substantially radially extending channels will be afforded between adjacent portions on the part and the side face of the rim through which air may be caused to flow, to thereby insure effective dissipation of heat generated as an incident to a deceleration effected by the application of a braking element, as a shoe, to the braking surface so afforded, and also to so secure the part affording such a braking surface to the wheel that installation and removal of the part on the wheel may be expeditiously effected.

A yet further object of this invention is to enable a part affording a braking surface on the axially inner or axially outer part of a railway wheel of the character embodying a separable rim portion or tire that the rim portion or tire may be removed without removing the part affording a braking surface as aforesaid.

Other and further objects of the present invention will be apparent from the following description and claims and are illustrated in the accompanying drawings which, by way of illustration, show preferred embodiments and the principle thereof and what I now consider to be the best mode in which I have contemplated applying that principle. Other embodiments of the invention embodying the same or equivalent principle may be used and structural changes may be made as desired by those skilled in the art without departing from the present invention and the purview of the appended claims.

In the drawings,

Fig. 1 is a plan view of a wheel embodying my invention and in which the support for the wheel is fragmentally illustrated, and also wherein a typical arrangement for applying braking elements to braking surfaces afforded on the wheel in accordance with my invention is illustrated;

Fig. 2 is a side elevation of a wheel embodying my invention;

Figs. 3 and 4 are sectional detail views taken substantially and respectively on the lines 3—3 and 4—4 on Fig. 2;

Fig. 5 is a fragmental side elevational view of a wheel and showing a modified form of my invention; and Fig. 6 is a sectional detail view taken substantially on the line 6—6 on Fig. 5.

In the accompanying drawings, and particularly in Figs. 1 to 4, inclusive, I have shown a wheel W of the character suitable for use on passenger cars or similar railway equipment, this wheel embodying a rim R having a flange F thereon at one side of the tread T on the peripheral portion of the wheel.

In accordance with my invention, substantially ring-shaped flat plates 10 and 11 are respectively disposed on the axially outer and axially inner faces of the wheel W and, as best shown in Fig. 4, the plates 10 and 11 are so related to the rim R of the wheel W that a portion of the peripheral portions of these plates are aligned with parts of the sides of the rim R, the peripheral portions of the plates 10 and 11 preferably being spaced inwardly from the tread T, as shown in Fig. 4.

Each plate 10 and 11 includes a flat outwardly disposed surface as 12 and 13 that affords a braking surface on the wheel, and desirably these braking surfaces are arranged in spaced relation with the sides of the rim R and to this end a plurality of spacers as 14 and 15 in the form of radially extending spaced apart webs are provided on the plates 10 and 11 to extend from the faces thereof opposite the braking surfaces 12 and 13 thereon. The free edges of the spacers or webs 14 and 15 are respectively engaged with the axially outer and axially inner faces of the rim R of the wheel W whereby radially extending channels as 16 are provided between adjacent spacers as 14 and the adjacent faces of the plate as 10 and the side face of the rim R, the spacers as 14 thereby being in the nature of fins on the plate as 10 with air channels as 16 therebetween.

In order to retain the plates as 10 and 11 in positions such as those above described, selected of the fins 14, at intervals in the extent of the plates as 10 and 11, are slightly enlarged and have arms or brackets as 17 and 18 unitary therewith which extend inwardly from the plate to terminate in substantially ring-shaped plates as 19 and 20 which, as best shown in Fig. 4, have the inwardly disposed faces thereof shaped to conform to the side faces of the spoke portion SP of the wheel W that is disposed between the rim R and the hub H thereof, and which, in many instances, is in the form of a continuous web, as illustrated. By arranging the inwardly disposed faces of the plates as 19 and 20 to conform to the faces of the spoke portion SP, these faces of these rings may be neatly fitted against the outwardly disposed faces of the spoke portion, and bolts as 21 may be passed through aligned openings in the plates 19 and 20 and spoke portion SP whereby when nuts as 21 are fastened on these bolts, the plates 19 and 20 may be tightly clamped to the spoke portion as SP to thereby clamp the inwardly disposed faces of the spacers as 14 and 15 tightly against the side faces of the rim R against which they are rested whereby the plates 10 and 11 are firmly secured in position on the wheel W.

It will therefore be seen that the arms or brackets as 17 and 18 and the plates as 19 and 20 constitute a bracket means for attaching the annular plates as 10 and 11 to the wheel as W.

In the present instance I have shown the wheel W mounted on an axle A that is mounted for rotation in a bearing arrangement afforded in a journal box J that is supported from the truck frame TF of a conventional railway truck. Such a truck is usually arranged to support two axles as A with a wheel as W at each end of each axle, and the arrangement is customarily such that the wheels at corresponding ends of such axles are adapted to roll along a rail.

Resort may be had to a wide variety of means for effecting deceleration of a wheel as W equipped with plates as 10 and 11 but one suitable arrangement is that shown in Fig. 1. As there illustrated, the arrangement includes segmental shoes S respectively engageable with the braking surfaces 12 and 13 on the plates 10 and 11. Moreover, a brace B, which may be secured to the frame to which the truck frame TF is connected in a conventional manner, carries a support bracket 23 which, in turn, supports a double acting cylinder 24 to which air under pressure may be admitted in the manner well understood in the art when a deceleration is to be effected. Furthermore, lugs 25 and 26 are suitably connected to the pistons (not shown) in the cylinder 24 and upon the admission of air under pressure to the cylinder the lugs 25 and 26 are forced outwardly. The lugs 27 and 28 are in the present instance provided on the brace B and serve as fulcrums for levers of the first class 29 and 30 which are pivotally connected to the lugs 27 and 28, as indicated at 31 and 32. Corresponding ends of the levers 29 and 30 are respectively pivotally connected to the lugs 25 and 26, as indicated at 33 and 34, and the opposite ends of these levers are pivotally connected to the shoes S, as indicated at 35 and 36. In an arrangement of this character, when air under pressure is admitted to the cylinder 24 and the lugs 25 and 26 are thereupon forced outwardly, the shoes S are respectively forced into engagement with the braking surfaces 12 and 13 on the plates 10 and 11.

In the present instance I have shown the shoes S as including facings of composition material and inasmuch as the plates 10 and 11 are metallic, resort to such an arrangement affords a composition friction material-to-metal engagement when the shoes S are applied to the braking surfaces 12 and 13 to effect a deceleration of the wheel W. However, it will be understood that metallic facings or unitary metallic shoes might be substituted for the shoes S, embodying composition facings as shown, without departing from the purview of my invention and when resort is had to such an arrangement and the shoes are applied to the braking surfaces as 12 and 13, a metal-to-metal engagement will be afforded for the purpose of effecting deceleration of the wheel W.

In any event when shoes as S are applied to braking surfaces as 12 and 13 to effect deceleration of a wheel as W, in those instances where the braking surfaces as 12 and 13 are afforded on elements as 10 and 11 which are spaced from the side faces of the rim R of a wheel as W by spacers as 14 and 15 in the nature of spaced apart fins having air channels as 16 therebetween, objectionable heating of the rim as R of the wheel as W will be avoided since, as the wheel rotates, air will flow through the radially extending channels 16 to thereby dissipate the heat generated as an incident to deceleration of the wheel effected by the application of the shoes to surfaces as 12 and 13. Moreover, by reason of the fact that the spacers or fins as 14 are provided at spaced apart intervals on a plate as 10, relatively restricted paths through which heat might flow from the plate as 10 to the side face of the rim as R are afforded which assist in overcoming objectionable heating of the rim as R of a wheel as W in the course of deceleration effected by the application of a shoe as S to a braking surface as 12.

The form of my invention as thus far described and disclosed in Figs. 1 to 4, inclusive, is particularly suitable in those instances where the portion of the rim R affording a tread as T is unitary with the spoke portion as SP and the hub as H of a wheel as W. In many instances, however, the rim portion of a wheel is afforded by an element in the form of a tire separate from the remainder of the wheel, a specific example of this being a so-called locomotive or driver wheel where the wheel consists of what is known as a wheel center WC and a tire or rim portion TP, the tire or rim portion TP being customarily sweated onto the periphery of the wheel center WC. As shown in Figs. 5 and 6, a wheel center as WC customarily includes a hub Ha and a spoke portion SP which, in the present instance, is in the form of independent spokes that serve to join the rim Ra of the wheel center to the hub Ha thereof. As best shown in Fig. 6, the tire portion TP is disposed about the periphery of the rim portion Ra of the wheel center WC and, as stated, it is customary to sweat a tire portion as TP onto the periphery of a rim portion as Ra.

In those instances where a wheel center as WC is employed and to which a tire portion as TP is adapted to be secured and it is desired to afford braking surfaces on the axially inner and axially outer faces of the wheel so afforded in accordance with my invention, I have found it to be advantageous to so arrange the elements affording the braking surfaces on the axially inner and axially outer faces that a tire portion as TP may be mounted on or removed from a wheel center as WC without removing the elements affording the braking surfaces from the wheel, and the arrangement shown in Figs. 5 and 6 is one that enables this to be accomplished.

Thus, as shown in Figs. 5 and 6, substantially ring-shaped flat plates 10a and 11a are respectively disposed on the axially outer and axially inner faces of the rim portion Ra of the wheel center WC in such position that the peripheral portions of the plates as 10a and 11a lie inwardly of the periphery of the rim Ra. Moreover, the plates as 10a and 11a, respectively, have spacers or fins 14a and 15a provided on the inwardly disposed faces thereof and the spacers and fins 14a are arranged in spaced apart relation, as best shown in Fig. 5, whereby radially extending channels as 16a are afforded between adjacent of such fins and the adjacent faces of the plate as 10a and the rim as Ra. The plates 10a and 11a, as in the case of the plates 10 and 11, have braking surfaces as 12a and 13a on the outwardly disposed faces thereof which are adapted to be engaged by shoes as S or other suitable braking elements when deceleration of the wheel including the wheel center WC is to be effected.

Desirably the plates as 10a and 11a are detachably connected to the wheel center as WC and to this end lugs or brackets as 40 and 41 are respectively provided on the substantially ring-shaped plates as 10a and 11a at spaced intervals along the inner peripheries thereof to project axially inwardly from such inner peripheries and, as best shown in Fig. 6, the lugs or brackets are offset inwardly from the inner face of each plate as 10a and 11a so that the inner faces of such lugs may be engaged with opposite faces of spokes as SPa or the face of a counterbalance as CB when the wheel center as WC includes such a counterbalance CB. In order to secure the plates as 10a and 11a to the wheel center as WC, aligned openings may be afforded in the lugs or brackets as 40, the spokes as SPa (or the counterbalance as CB), and the lugs or brackets as 41, and bolts as 42 may be passed through these aligned openings whereby when nuts as 43 are fastened to the bolts, the plates as 10a and 11a may be firmly connected to the wheel center as WC with the free edges of the spacers or fins as 14a or 15a tightly clamped against the side faces of the rim portion as Ra. It will therefore be seen that the lugs or brackets as 40 and 41 constitute a bracket means for attaching the annular plates as 10a and 11a to the wheel as Wa.

It will be understood that when shoes as S or other suitable braking elements are applied to braking surfaces as 12a and 13a afforded on elements or parts secured to a wheel center as WC to thereby effect deceleration of the wheel of which the wheel center WC is a part, air may flow through the radially extending channels as 16a so that heat generated as an incident to the deceleration may be dissipated to thereby avoid objectionable heating of a rim portion as Ra and by that fact objectionable heating of a tire as TP. Furthermore, as in the case of the arrangement of the plates 10 and 11 on opposite sides of the rim R, the spacers or fins as 14a and 15a limit the heat conductivity between the parts to which the braking elements are applied and the wheel center as WC, which further avoids objectionable heating of the rim portion as Ra of a wheel center as WC.

It will be apparent from the foregoing description that my invention enables braking surfaces to be afforded on the axially inner or axially outer faces of a wheel of railway equipment or the like in such a manner that objectionable heating of such a wheel and particularly the rim portion thereof will be avoided. Moreover, in accordance with my invention the parts or elements affording such braking surfaces may be expeditiously installed and removed when and as this may be required. Still further in accordance with my invention, when elements are secured to a wheel embodying a removable tire portion, the parts may be so related that installation and removal of such a tire portion may be expeditiously effected.

Hence, while I have illustrated and described preferred embodiments of my invention, it is to be understood that these are capable of variation and modification and I therefore do not wish to be limited to the precise details set forth, but desire to avail myself of such changes and alterations as fall within the purview of the following claims.

I claim:

1. In a wheel for use on railway or like equipment and including a rim portion having a tread thereon, a substantially annular member providing a braking surface and secured against a side face of the rim portion with the periphery thereof spaced inwardly of the tread on said wheel, a plurality of spaced apart elements of restricted size interposed between adjacent faces of said member and said side face and affording restricted paths for heat transmission, said elements being spaced one from the other whereby a plurality of channels extended substantially radially of the wheel are afforded and through which air may flow during rotation of the wheel to assist in the dissipation of heat generated as an incident to a deceleration effected by the application of a braking element to said braking surface, bracket means including portions extended axially inwardly from said annular member at spaced apart positions along the extent thereof, and means for detachably securing said bracket means to said wheel to thereby detachably secure said annular member to said wheel.

2. In a wheel for use on railway or like equipment and including a rim portion having a tread thereon, a substantially annular member providing a braking surface and secured against a side face of the rim portion with the periphery thereof spaced inwardly of the tread on said wheel, a plurality of spaced apart webs on said member disposed to extend substantially radially of said wheel and interposed between said member and the side face of said rim portion to afford a plurality of channels extended substantially radially of the wheel and through which air may flow during rotation of the wheel to assist in the dissipation of heat generated as an incident to a deceleration effected by the application of a braking element to said braking surface, bracket means including portions extended axially inwardly from said annular member in alignment with spaced apart of said webs, and means for detachably securing said bracket means to said wheel to thereby detachably secured said annular member to said wheel.

3. A wheel for use on railway or like equipment and including a rim portion having a tread on the periphery thereof, a substantially annular member providing a braking surface and arranged on an axial face of said wheel and having the periphery thereof spaced inwardly from the tread on said rim portion and having at least a portion thereof extended over a side face of said rim portion, a plurality of substantially radially extending webs interposed between said member and the side face of said rim portion and spaced apart one from the other and defining a plurality of channels extended substantially radially of the wheel and through which air may flow during rotation of the wheel to assist in the dissipation of heat generated as an incident to a deceleration effected by the application of a braking element to said braking surface, and means for securing said member on said wheel and against the side face of said rim portion and embodying bracket means including portions extended axially inwardly from said annular member at spaced apart positions along the extent thereof, and means for detachably securing said bracket means to said wheel to thereby detachably secure said member in position on said wheel.

4. A wheel for use on railway or like equipment and including a rim portion having a tread on the periphery thereof, a substantially annular member providing a braking surface and arranged on an axial face of said wheel and having the periphery thereof spaced inwardly from the tread on said rim portion and having at least a portion thereof extended over a side face of said rim portion, a plurality of substantially radially extending webs interposed between said member and the side face of said rim portion and spaced apart one from the other and defining a plurality of channels extended substantially radially on the wheel and through which air may flow during rotation of the wheel to assist in the dissipation of heat generated as an incident to a deceleration effected by the application of a braking element to said braking surface, a plurality of brackets connected to said members at spaced apart positions along the extent thereof and extended axially inwardly from said member toward the adjacent portion of said wheel, and means for detachably connecting said brackets to said wheel to thereby secure said member against the side face of said rim portion.

5. A wheel for use on railway or like equipment and including a rim portion having a tread on the periphery thereof, a substantially annular member providing a braking surface and arranged on an axial face of said wheel and having the periphery thereof spaced inwardly from the tread on said rim portion and having at least a portion thereof extended over a side face of said rim portion, a plurality of webs on said member interposed between said member and the adjacent side face of said rim and spaced apart one from the other whereby a plurality of channels extending substantially radially of the wheel are afforded and through which air may flow during rotation of the wheel to assist in dissipation of heat generated as an incident to a deceleration effected by the application of a braking element to said braking surface, attaching means unitary with said member and including a second annular member disposed axially inwardly of the first named annular member and engaged with said wheel, said attaching means also including a plurality of brackets extended between said annular members at spaced apart positions along the extent thereof, and means for detachably securing said attaching means to said wheel to thereby secure said webs in engagement with the adjacent side face of said rim portion.

6. A wheel for use on railway or like equipment and including a rim portion having a tread on the periphery thereof, a substantially annular member providing a braking surface and arranged on an axial face of said wheel and having the periphery thereof spaced inwardly from the tread on said rim portion and having at least a portion thereof extended over a side face of said rim portion, a plurality of webs on said member interposed between said member and the adjacent side face of said rim and spaced apart one from the other whereby a plurality of channels extending substantially radially of the wheel are afforded and through which air may flow during rotation of the wheel to assist in dissipation of heat generated as an incident to a deceleration effected by the application of a braking element to said braking surface, a plurality of brackets unitary with said annular member and including portions extended axially inwardly from said annular member and other portions arranged for engagement with said wheel, and means for detachably connecting said brackets to said wheel to thereby secure said webs against the side face of said rim portion.

7. A wheel for use on railway or like equipment and including a rim portion having a tread on the periphery thereof, a substantially annular member providing a braking surface and arranged on an axial face of said wheel and having the periphery thereof spaced inwardly from the tread on said rim portion and having at least a portion thereof extended over a side face of said rim portion, a plurality of webs on said member interposed between said member and the adjacent side face of said rim and spaced apart one from the other whereby a plurality of channels extending substantially radially of the wheel are afforded and through which air may flow during rotation of the wheel to assist in dissipation of heat generated as an incident to a deceleration effected by the application of a braking element to said braking surface, a plurality of brackets unitary with selected of said webs, a second substantially annular member to which said brackets are secured, and means for detachably connecting said second substantially annular member to said wheel to thereby secure said webs against the side face of said rim portion.

8. In a wheel for use on railway or like equipment and including a rim portion having a tire removably mounted thereon, a substantially annular member providing a braking surface and secured against a side face of the rim portion with the periphery thereof spaced inwardly of the tire on the rim portion whereby the tire may be removed from the wheel without removing the member, a plurality of spaced apart elements of restricted size interposed between adjacent faces of said member and said side face and affording restricted paths for heat transmission, said elements being spaced one from the other whereby a plurality of channels extended substantially radially of the wheel are afforded and through which air may flow during rotation of the wheel to assist in the dissipation of heat generated as an incident to a deceleration effected by the application of a braking element to said braking surface, bracket means including portions extended axially inwardly from said annular member at spaced apart positions along the extent thereof, and means for detachably securing said bracket means to said wheel to thereby detachably secure said annular member to said wheel.

9. In a wheel for use on railway or like equipment and including a rim portion having a tire removably mounted thereon, a substantially annular member providing a braking surface and secured against a side face of the rim portion with the periphery thereof spaced inwardly of the tire on the rim portion whereby the tire may be removed from the wheel without removing the member, a plurality of spaced apart webs on said member disposed to extend substantially radially of said wheel and interposed between said member and the side face of said rim portion to afford a plurality of channels extended substantially radially of the wheel and through which air may flow during rotation of the wheel to assist in the dissipation of heat generated as an incident to a deceleration effected by the application of a braking element to said braking surface, bracket means including portions extended axially inwardly from said annular member in alignment with spaced apart of said webs, and means for detachably securing said bracket means to said wheel to thereby detachably secure said annular member to said wheel.

10. In a wheel for use on railway or like equipment and including a rim portion having a tire removably mounted thereon, a substantially annular member providing a braking surface and secured against a side face of the rim portion with the periphery thereof spaced inwardly of the tire on the rim portion whereby the tire may be removed from the wheel without removing the member, a plurality of substantially radially extending webs interposed between said member and the side face of said rim portion and spaced apart one from the other and defining a plurality of channels extended substantially radially on the wheel and through which air may flow during rotation of the wheel to assist in the dissipation of heat generated as an incident to a deceleration effected by the application of a braking element to said braking surface, a plurality of lugs extended radially inward from said member at spaced apart positions along the extent thereof, said lugs also being extended axially inwardly from said member toward the adjacent portion of the wheel, and means for detachably connecting said lugs to the adjacent portion of the wheel.

MAURICE N. TRAINER.